United States Patent [19]

Nakamura et al.

[11] 4,096,184

[45] Jun. 20, 1978

[54] PROCESS FOR PREPARING ACID AMIDES

[75] Inventors: Shinji Nakamura; Shun Inokuma, both of Takatsuki; Shin Tanaka, Sonehigashi; Kenichi Hirose; Takashi Deguchi, both of Ibaraki, all of Japan

[73] Assignee: Sumitomo Chemical Company, Limited, Osaka, Japan

[21] Appl. No.: 755,138

[22] Filed: Dec. 29, 1976

[30] Foreign Application Priority Data

| Jan. 19, 1976 | Japan | 51-5289 |
| Jan. 21, 1976 | Japan | 51-6252 |
| Mar. 22, 1976 | Japan | 51-31681 |
| May 17, 1976 | Japan | 51-57082 |

[51] Int. Cl.² ............................................. C07C 103/08
[52] U.S. Cl. .............................. 260/561 N; 252/476; 260/291; 260/557 R; 260/558 R; 260/561 R; 260/561 B; 260/559 R
[58] Field of Search ........... 260/561 N, 557 R, 561 R, 260/562 C, 558 R; 252/476

[56] References Cited

U.S. PATENT DOCUMENTS

| 3,381,034 | 4/1968 | Greene | 260/557 R |
| 3,696,152 | 10/1972 | Habermann et al. | 260/558 R |
| 3,758,578 | 9/1973 | Habermann et al. | 260/558 R |
| 3,767,706 | 10/1973 | Habermann et al. | 260/558 R |
| 3,789,074 | 1/1974 | Seale et al. | 252/476 |
| 3,911,009 | 10/1975 | Yoshimura et al. | 260/561 R |
| 3,941,837 | 3/1976 | Asano et al. | 260/561 R |
| 3,997,606 | 12/1976 | Kane | 260/561 R |
| 4,010,238 | 3/1977 | Shiraishi et al. | 252/476 |

OTHER PUBLICATIONS

Kurato et al., Chem. abstr. 81 (1974) #120025.

*Primary Examiner*—Arthur P. Demers
*Attorney, Agent, or Firm*—Birch, Stewart, Kolasch and Birch

[57] ABSTRACT

A process for preparing acid amides by hydration of the corresponding nitrile compounds with water in the presence of a catalyst, characterized in that the catalyst is the one prepared by treating a vanadate with a cuprous salt or with at least two of metallic copper, a cuprous salt and a cupric salt.

16 Claims, No Drawings

PROCESS FOR PREPARING ACID AMIDES

The present invention relates to a process for preparing acid amides. More particularly, it relates to a process for preparing acid amides by hydration of nitrile compounds in the presence of a novel catalyst.

There has heretofore been known the catalytic hydration of nitrile compounds with water in the presence of a catalyst containing metallic copper to produce the corresponding acid amides. The conversion in this hydration is representable by the following formulae:

$$R-C\equiv N + H_2O \rightarrow R-CONH_2$$

wherein R is an organic radical.

As the catalyst useful in such hydration, there are known various metallic copper catalysts such as a copper metal obtained by reduction of a copper compound with a reducing agent, a copper metal obtained by thermal decomposition of cupric formate or cupric oxalate, Raney copper and Urushibara copper. These metallic copper catalysts are practically utilized in the industrial production of acid amides but still have some drawbacks such as complexity in their preparation, difficulty in handling due to their extreme activity to molecular oxygen and unavoidable by-production of waste liquor including organic materials and heavy metals.

On the other hand, it is known that monovalent and divalent copper compounds are useful as the catalyst for the said hydration of nitrile compounds [cf. U.S. Pat. No. 3,381,034]. However, the hydration activity of those monovalent and divalent copper compounds is extremely low. It is also known that the catalytic activity of a copper catalyst obtained by treating metallic copper with a vanadate is superior to that of metallic copper itself [cf. Japanese Patent Publication (unexamined) No. 35315/1974]. However, the metallic copper to be used in this process is required to be an activated one, because ordinary metallic copper as commercially available can not be materially activated.

As the result of the extensive study, it has now been found that a catalyst obtained by treating a vanadate with a cuprous salt or with at least two of metallic copper, a cuprous salt and a cupric salt has a remarkably high catalytic activity in the hydration of nitrile compounds with water into the corresponding acid amides. This invention is based on this finding.

According to the present invention, there is provided a process for preparing acid amides by hydration of the corresponding nitrile compounds with water in the presence of a catalyst, characterized in that the catalyst is the one obtained by treating a vanadate with a cuprous salt or with at least two of metallic copper, a cuprous salt and a cupric salt.

The vanadate to be used in the preparation of the catalyst of the invention may be defined, as described in Cotton et al.: "Advanced Inorganic Chemistry", 3rd Ed., pages 821-825 (1972), an anion comprising a pentavalent vanadium atom and an oxygen atom, which may be represented, for instance, by the formula: $x\ M_2^I O.y\ V_2O_5.n\ H_2O$ ($M^I$ = monovalent cation) or $x\ M^{II}O.y\ V_2O_5.n\ H_2O$ ($M^{II}$ = divalent cation) wherein $n$ is a number including zero. While no limitation is present on the kinds of the monovalent and divalent cations, an alkali metal ion, an alkaline earth metal ion and a copper ion are favorable. Specific examples of the vanadate are sodium orthovanadate, sodium metavanadate, sodium pyrovanadate, potassium orthovanadate, potassium metavanadate, potassium pyrovanadate, cuprous orthovanadate, cupric orthovanadate, cuprous metavanadate, cupric metavanadate, cuprous pyrovanadate, cupric pyrovanadate, etc. and mixtures thereof. Polyvanadates and isopolyvanadates, of which the chemical structures are still undetermined, are also included in the examples of the vanadate. Preferables are sodium orthovanadate, sodium metavanadate, sodium pyrovanadate and mixtures thereof, potassium orthovanadate, potassium metavanadate, potassium pyrovanadate and mixtures thereof, and cupric orthovanadate, cupric metavanadate, cupric pyrovanadate and mixtures thereof.

The said vanadates may be prepared by various known procedures, for instance, by dissolving vanadium pentoxide or ammonium vanadate with an alkali metal salt (e.g. sodium carbonate, sodium hydroxide) in an appropriate proportion in an aqueous medium, or by mixing them together and heating the resultant mixture. In case of the vanadate being the cupric vanadates or mixtures thereof, it may be prepared, for instance, by admixing an alkali metal, alkaline earth metal or ammonium salt of vanadic acid with a cupric compound (e.g. cupric chloride, cupric bromide, cupric sulfate, cupric nitrate, cupric perchlorate, cupric formate, cupric acetate, cupric propionate, cupric hydroxide, cupric carbonate) in an aqueous medium or by admixing cupric oxide, cupric carbonate, cupric hydroxide or cupric nitrate with vanadium pentoxide or ammonium vanadate in an appropriate proportion and then heating the resultant mixture. The thus prepared cupric vanadates or mixtures thereof may be used for production of the catalyst of the invention without or after separation from the reaction mixture. In the separation, it is preferred to apply a wet separation method.

A part of the vanadate may be replaced by any other oxoacid salt, of which the metal component may be Mo, Cr, W, etc. In such case, the atomic ratio of such metal component and vanadium may be usually 0.01 to 0.5 : 1, preferably 0.01 to 0.1 : 1. Those oxoacid salts can be prepared in the similar manner to the production of the vanadates as hereinabove described.

As the metallic copper, there may be used any commercially available copper metal itself. There may be also used a copper metal activated by any conventional method.

Examples of the cuprous salt are cuprous chloride, cuprous bromide, cuprous iodide, cuprous sulfate, cuprous nitrate, cuprous formate, cuprous acetate, cuprous oxide, etc. Among them, cuprous chloride is used the most preferably. Instead of a cuprous salt itself, a compound obtained from metallic copper and a cupric salt (e.g. cupric chloride, cupric bromide, cupric sulfate, cupric nitrate, cupric formate, cupric acetate) may be also employed, since they can be considered to be chemical equivalent.

As the cupric salt, cupric chloride, cupric bromide, cupric nitrate, cupric sulfate, cupric perchlorate, cupric formate, cupric acetate, cupric propionate, cupric hydroxide, cupric carbonate, cupric oxide, etc. are utilizable. A part of the cupric salt may be replaced by a salt(s) of any other metal(s) such as Fe, Mn and Sn. The atomic ratio of such other metal and copper may be usually 0.01 to 0.5 : 1, preferably 0.01 to 0.1 : 1.

In preparation of the catalyst of the invention, the amount of the cuprous salt or at least two of the metallic copper, the cuprous salt and the cupric salt to be treated with the vanadate is not limitative. Usually, however, the atomic ratio of Cu and V is preferred to be from 1 : 0.01 to 1 : 100, particularly from 1 : 0.1 to 1 : 10. When at least two of metallic copper, a cuprous salt and a cupric salt are used, the atomic proportion of $Cu^o$ : $Cu^I$, $Cu^o$ : $Cu^{II}$ or $Cu^I$ : $Cu^{II}$ may be from 1 : 0.01 to 1 : 100, preferably from 1 : 0.1 to 1 : 10, and that of $Cu^o$ : $Cu^I$ : $Cu^{II}$ may be usually from 1 : 0.01 : 0.01 to 1 : 100 : 100, preferably from 1 : 0.1 : 0.1 to 1 : 10 : 10.

The preparation of the catalyst of the invention is usually carried out in a liquid medium, especially water, preferably adjusted to an appropriate pH by incorporating carbonate ions, acetate ions or the like therein. The presence of a nitrile compound in the system affords generally a good influence on the catalyst as prepared. While no limitation is present on the reaction temperature, it is usually within a range of from 0° to 100° C.

The thus prepared catalyst may be used with or without its separation from the reaction mixture for hydration of nitrile compounds. When an oxidizing agent is reacted on the catalyst separated or not from the reaction mixture, the catalytic activity may be usually enhanced. Examples of the oxidizing agent are oxygen, oxygen-containing gas, hydrogen peroxide, organic peroxides, metal salts in highly oxidized states, etc. More specifically, the following oxidizing agents are exemplified: oxygen, oxygen-containing gas, hydrogen peroxide, benzoyl peroxide, benzyl hydroperoxide, cumene hydroperoxide, ethylbenzene hydroperoxide, $Sn^{4+}$ salts, $Fe^{3+}$ salts, etc. Among them, the use of oxygen, oxygen-containing gas or hydrogen peroxide is particularly preferred. The amount of oxidizing agents depends on the composition of the catalysts to be used. In using a catalyst prepared by treating the vanadate with the cuprous salt, it is preferred to use the oxidizing agents in an amount of 0.1 to 100% by equivalent, more preferably 10 to 60% by equivalent, to the copper atom contained in the catalyst.

It may be noted that the catalyst of the invention is not required to comprise metallic copper as the essential component. It may be also noted that, different from a conventional catalyst comprising oxides of $Cu^I$ and $Cu^{II}$, the catalyst of the invention is highly active.

As the nitrile compound to be hydrated by the process of the invention, there may be exemplified aliphatic nitriles, aromatic nitriles, heterocyclic nitriles, etc. More specifically, there may be exemplified substituted and unsubstituted alkylnitriles (e.g. acetonitrile, propionitrile, butyronitrile, methoxyacetonitrile), substituted and unsubstituted alkenylnitriles (e.g. acrylonitrile, methacrylonitrile, crotononitrile, allyl cyanide), substituted and unsubstituted cycloalkylnitriles (e.g. cyclohexanecarbonitrile), substituted and unsubstituted aralkylnitriles (e.g. benzyl cyanide, α-naphthylacetonitrile), substituted and unsubstituted aralkenylnitriles (e.g. cinnamonitrile), substituted and unsubstituted arylonitriles (e.g. benzonitrile, naphthonitrile), substituted and unsubstituted pyridylnitriles (e.g. nicotinonitrile), polynitriles (e.g. cyanogen, adiponitrile, phthalonitrile, glutaronitrile), other nitriles (e.g. benzoyl cyanide, acetyl cyanide), etc.

The hydration reaction is carried out by treatment of the nitrile compound with water in the presence of the said catalyst, usually at a temperature of from room temperature to about 300° C. For increasing the reaction rate and preventing the side reaction, it is particularly preferred to effect the reaction at a temperature of from about 50° to 150° C. The water may be employed in a theoretical amount but the use in an excessive amount, for instance, in a 1.5 to 50 equivalent amount to the nitrile compound is favorable.

When the starting nitrile compound is a polymerizable one such as acrylonitrile or methacrylonitrile, a polymerization inhibitor such as a heavy metal salt (e.g. manganese salt, iron salt, copper salt) may be present in the reaction system. If desired, any inert organic solvent (e.g. N,N-dimethylformamide, N,N-dimethylacetamide, N-methylpyrrolidone, acrylamide) may be used as the reaction medium.

The amount of the catalyst to be used may vary depending upon the manner in which the reaction is carried out or the type thereof. The reaction may be effected in a gas phase but preferably in a liquid phase. When a suspension procedure is applied, the amount of the catalyst is usually about 0.01% by weight or more, preferably from about 0.05 to 100% by weight on the basis of the weight of the starting reaction mixture. Although the suspension procedure is advantageously applicable, it is also convenient to employ a fixed bed procedure. In the fixed bed procedure, the amount of the catalyst may vary depending upon the reaction temperature and the concentration of the starting nitrile compound, and the space velocity therein may be usually from about 0.1 to 100 hour$^{-1}$, preferably from about 1 to 50 hour$^{-1}$.

The reaction proceeds rapidly with an extremely high selectivity to afford the corresponding acid amide in high yields.

Practical and presently preferred embodiments of the invention are illustratively shown in the following Examples.

EXAMPLES 1 to 6

Into a 50 ml volume reactor, a cupric salt (2.25 mmole), sodium orthovanadate monohydrate (1.5 mmole) and reagent grade copper powder (142.9 mg; 2.25 mmole) were charged under nitrogen atmosphere, and water (20 ml) was added thereto. Stirring was continued at room temperature for 5 minutes. Then, acrylonitrile (1.2 g) was added to the reactor, and the hydration reaction was carried out at 80° C for 1 hour. After completion of the reaction, the quantitative determination of the produced amide was effected by gas chromatography. From the reaction mixture, the produced amide was separated by a conventional procedure and confirmed to be acrylamide by MASS, NMR, IR, etc. The results are shown in Table 1. Ethylene cyanohydrin, hydroxypropionamide and ammonium acrylate was not detected.

Table 1

| Example | Cupric salt | Conversion (%) | Selectivity (%) |
|---|---|---|---|
| 1 | $CuCl_2$ | 85.0 | 100 |
| 2 | $CuSO_4$ | 67.0 | 100 |
| 3 | $Cu(NO_3)_2$ | 45.7 | 100 |
| 4 | $Cu(OCOCH_3)_2$ | 16.5 | 100 |
| 5 | $Cu(BF_4)_2$ | 9.6 | 100 |
| 6 | $Cu(OCOH)_2$ | 34.0 | 100 |

EXAMPLES 7 to 9

Into a 50 ml volume reactor, a cupric salt (3.25 mmole), sodium metavanadate tetrahydrate (1.26 g; 6.5 mmole) and reagent grade copper powder (0.21 g; 3.25 mmole) were charged under nitrogen atmosphere, and the subsequent operation was carried out in the same manner as in Example 1. The results are shown in Table 2. Ethylene cyanohydrin was not detected.

Table 2

| Example | Cupric salt | Conversion (%) | Selectivity (%) |
|---------|-------------|----------------|-----------------|
| 7 | $CuCl_2$ | 78.7 | 100 |
| 8 | $CuSO_4$ | 74.0 | 100 |
| 9 | $Cu(OCOCH_3)_2$ | 23.0 | 100 |

EXAMPLES 10 to 12

Into a 50 ml volume reactor, cupric chloride (1.6 mmole), sodium metavanadate (3.25 mmole) and copper powder were charged under nitrogen atmosphere, and the subsequent operation was carried out in the same manner as in Example 1. The results are shown in Table 3. Ethylene cyanohydrin was not detected.

Table 3

| Example | Copper powder | mmole | Conversion (%) |
|---------|--------------|-------|----------------|
| 10 | Commercially available | 6.5 | 99.6 |
| 11 | Commercially available | 3.25 | 96.0 |
| 12 | Produced by treatment of copper oxide with $NaBH_4$ | 6.5 | 99.6 |

EXAMPLES 13 to 15

Into a 50 ml volume reactor, a cupric salt (1.63 mmole), copper powder (3.2 mmole) and sodium metavanadate (3 mmole) were charged under nitrogen atmosphere, and the subsequent operation was carried out in the same manner as in Example 1. The results are shown in Table 4. Ethylene cyanohydrin was not detected.

Table 4

| Example | Cupric salt | Conversion (%) |
|---------|-------------|----------------|
| 13 | $CuSO_4$ | 47.6 |
| 14 | $Cu(OCOCH_3)_2$ | 51.1 |
| 15 | $Cu(NO_3)_2$ | 56.0 |

EXAMPLES 16 to 18

Into a 150 ml volume reactor, cupric chloride (1.74 mmole), a metal salt (0.06 mmole) and water (80 ml) were charged under nitrogen atmosphere, and sodium orthovanadate (1.2 mmole), copper powder (3 mmole) and acrylonitrile (6 ml) were added thereto. Then, the hydration reaction was carried out at 80° C for 30 minutes. The reaction mixture was treated as in Example 1. The results are shown in Table 5. Ethylene cyanohydrin was not detected.

Table 5

| Example | Metal salt | Conversion (%) |
|---------|-----------|----------------|
| 16 | $FeCl_3 \cdot 6H_2O$ | 49.6 |
| 17 | $SnCl_2 \cdot 2H_2O$ | 37.1 |
| 18 | $MnCl_2 \cdot 4H_2O$ | 26.9 |

EXAMPLES 19 to 22

Into a 150 ml volume reactor, sodium orthovanadate (1.2 mmole), water (80 ml) and cupric chloride (3 mmole) were charged under nitrogen atmosphere, and copper reduced with iron powder and acrylonitrile (6 ml) were added thereto. Then, the hydration reaction was carried out at 80° C for 30 minutes. The reaction mixture was treated as in Example 1. The results are shown in Table 6. Ethylene cyanohydrin was not detected.

Table 6

| Example | Copper (mmole) | Conversion (%) |
|---------|----------------|----------------|
| 19 | 1.5 | 29.9 |
| 20 | 2.4 | 67.9 |
| 21 | 3.0 | 40.2 |
| 22 | 6.0 | 14.1 |

EXAMPLES 23 to 25

Into a 50 ml volume reactor, sodium hydroxide, vanadium pentoxide, cupric chloride and commercially available metallic copper were charged under nitrogen atmosphere, and water (20 ml) and acrylonitrile (1.5 ml) were added thereto. Then, the hydration reaction was carried out at 80° C for 30 minutes. The reaction mixture was treated as in Example 1. The results are shown in Table 7. Ethylene cyanohydrin was not detected.

Table 7

| Example | NaOH (mmole) | $V_2O_5$ (mmole) | $Cu^{II}$ (mmole) | $Cu^o$ (mmole) | Conversion (%) |
|---------|--------------|------------------|-------------------|----------------|----------------|
| 23 | 0.9 | 0.15 | 0.75 | 0.75 | 66.8 |
| 24 | 4.5 | 0.75 | 2.25 | 2.25 | 98.6 |
| 25 | 1.8 | 0.30 | 1.5 | 1.5 | 99.6 |

EXAMPLE 26

Into a 300 ml volume reactor, sodium hydroxide (18 mmole), water (200 ml), vanadium pentoxide (3 mmole), cupric chloride (15 mmole), metallic copper (15 mmole) and acrylonitrile (15 ml) were charged in this order under nitrogen atmosphere, and stirring was carried out at 80° C for 30 minutes. After cooling, the precipitated solid was collected by filtration and dried in nitrogen atmosphere. The thus obtained solid (0.3 g), water (20 ml) and acrylonitrile (1.5 ml) were charged into a 50 ml volume reactor under nitrogen atmosphere, and the hydration reaction was carried out at 80° C for 30 minutes. After completion of the reaction, the produced amide in the reaction mixture was quantitatively determined in the same procedure as in Example 1 to confirm the conversion of acrylonitrile being 78.8%. No ethylene cyanohydrin was detected.

EXAMPLE 27

Into a 50 ml volume reactor, cuprous chloride (0.64 g; 6.5 mmole) and sodium metavanadate tetrahydrate (1.26 g; 6.5 mmole) were charged, and water (20 ml) and acrylonitrile (1.2 g) were added thereto. The hydration reaction was carried out at 80° C for 1 hour. After completion of the reaction, the produced amide was quantitatively determined by gas chromatography to confirm the conversion of acrylonitrile being 55.7%. No ethylene cyanohydrin was detected.

EXAMPLE 28

As in Example 27 but using potassium metavanadate (0.90 g; 6.5 mmole) in place of sodium metavanadate tetrahydrate, the operation was carried out. The conversion of acrylonitrile was 60.0%. No ethylene cyanohydrin was detected.

EXAMPLE 29

Into a 50 ml volume reactor, sodium orthovanadate (0.303 g; 1.5 mmole), water (20 ml) and acrylonitrile (1.2 g) were charged, and cuprous chloride (0.445 g; 4.5 mmole) was added thereto. The hydration reaction was carried out at 80° C for 30 minutes. After completion of the reaction, the produceed amide was quantitatively determined by gas chromatography to confirm the conversion of acrylonitrile and the selectivity to acrylamide being respectively 94.9% and 100%.

EXAMPLE 30

As in Example 29 but effecting the reaction under nitrogen atmosphere first at room temperature for 1 hour and then at 80° C for 30 minutes, the operation was carried out. The conversion of acrylonitrile and the selectivity to acrylamide were respectively 79.1% and 100%.

EXAMPLE 31

Into a reactor, sodium orthovanadate monohydrate (5 g) and water (150 ml) were charged, acrylonitrile (8 g) and cuprous chloride (7.35 g) were added thereto, and stirring was effected at room temperature for 3 hours. The precipitated solid was collected by filtration and dried in nitrogen atmosphere. The thus obtained solid (0.296 g) was charged into a reactor, and water (20 ml) and acrylonitrile (1.2 g) were added thereto under nitrogen atmosphere. The hydration reaction was carried out at 80° C for 1 hour. After completion of the reaction, the produced amide was quantitatively determined by gas chromatography to confirm the conversion of acrylonitrile and the selectivity to acrylamide being respectively 71.0 and 100%.

EXAMPLE 32

Into a 50 ml volume reactor, sodium orthvanadate (0.853 mmole), potassium chromate (0.047 mmole), water (20 ml) and acrylonitrile (1.5 ml) were charged, and cuprous chloride (4.5 mmole) was added thereto. The hydration reaction was carried out at 80° C for 30 minutes. After completion of the reaction, the produced amide was quantitatively determined by gas chromatography to confirm the conversion of acrylonitrile and the selectivity to acrylamide being respectively 85.1 and 100%.

EXAMPLE 33

As in Example 32 but using sodium molybdate (0.047 mmole) in place of potassium chromate, the operation was carried out. The conversion of acrylonitrile and the selectivity to acrylamide were respectively 92.8 and 100%.

EXAMPLE 34

Into a 50 ml volume reactor flushed with nitrogen, sodium orthovanadate (0.303 g; 1.5 mmole), water (20 ml) and acrylonitrile (1.2 g) were charged, and cuprous chloride (0.445 g; 4.5 mmole) and 30% aqueous solution of hydrogen peroxide (0.185 mmole) were added thereto. After the reactor was sealed, the hydration reaction was carried out at 80° C for 1 hour. After completion of the reaction, the produced amide was quantitatively determined by gas chromatography to confirm the conversion of acrylonitrile and the selectivity to acrylamide being respectively 79.7 and 100%. The amount of hydrogen peroxide used to copper was 4.1% by mole.

EXAMPLE 35

As in Example 34 but using 30% aqueous solution of hydrogen peroxide (0.291 mmole), the operation was carried out. The conversion of acrylonitrile and the selectivity to acrylamide were respectively 98.5 and 100%. The amount of hydrogen peroxide used to copper was 6.5% by mole.

EXAMPLE 36

As in Example 34 but using 30% aqueous solution of hydrogen peroxide (0.510 mmole), the operation was carried out. The conversion of acrylonitrile and the selectivity to acrylamide were respectively 98.8 and 100%. The amount of hydrogen peroxide used to copper was 11.3% by mole.

EXAMPLE 37

Into a 50 ml volume reactor, cuprous chloride (0.32 g; 3.25 mmole), sodium metavanadate tetrahydrate (0.63 g; 3.25 mmole) and reagent grade copper powder (0.31 g; 4.9 mmole) were charged, and water (20 ml) was added thereto. After stirring at room temperature for 5 minutes, acrylonitrile (1.2 g) was added. Then, the hydration reaction was carried out at 80° C for 1 hour. After completion of the reaction, the resulting acrylamide was quantitatively determined by gas chromatography to confirm the conversion of acrylonitrile being 96.8%. No ethylene cyanohydrin was detected.

EXAMPLE 38

As in Example 37 but using potassium metavanadate (0.45 g; 3.25 mmole) in place of sodium metavanadate tetrahydrate, the operation was carried out. The conversion of acrylonitrile was 93.0%. No ethylene cyanohydrin was detected.

EXAMPLE 39

(A) Preparation of Catalyst

Into a 200 ml volume flask, a solution of sodium orthovanadate (4.0 g) in water (100 ml) was charged, and a solution of cupric chloride dihydrate (5.0 g) in water (10 ml) was added thereto while stirring. The precipitate was collected by filtration, washed with water and dried to give a dull, yellowish green solid.

(B) Hydration of Nitrile Compound

Into a 50 ml volume reactor flushed with nitrogen, the above prepared solid (0.420 g), water (20 ml), reagent grade copper powder (0.191 g) and acrylonitrile (1.2 g) were charged, and the reactor was sealed. The hydration reaction was carried out at 80° C for 30 minutes. After completion of the reaction, the produced amide was quantitatively determined to confirm the conversion of acrylonitrile and the selectivity to acrylamide being respectively 99.8 and 100%.

EXAMPLE 40

(a) Preparation of Catalyst

Into a 1,000 ml volume flask, vanadium pentoxide (9.05 g) and 1 N NaOH aqueous solution (100 ml) were charged, and 1 M $CuSO_4$ aqueous solution (150 ml) and 1 N NaOH aqueous solution (200 ml) were added thereto while stirring. The precipitate was collected by filtration, washed with water and dried to give a dull, yellowish green solid.

(B) Hydration of Nitrile Compound

Into a 50 ml volume reactor flushed with nitrogen, the above prepared solid (0.474 g), water (20 ml), reagent grade copper powder (0.191 g) and acrylonitrile (1.2 g) were added thereto, and the reactor was sealed. The hydration reaction was carried out at 80° C for 30 minutes. The conversion of acrylonitrile and the selectivity to acrylamide were respectively 58.2 and 100%.

EXAMPLE 41

(A) Preparation of Catalyst

Into a 500 ml volume flask, a solution of sodium hydroxide (4.8 g) in water (300 ml) was charged, and vanadium pentoxide (3.64 g) was added thereto under stirring. After the reaction mixture turned to colorless, a solution of cupric chloride dihydrate (10.2 g) in water (50 ml) was added thereto. The precipitate was collected by filtration, washed with water and dried to give a yellowish green solid.

(B) Hydration of Nitrile Compound

Into a 50 ml volume reactor flushed with nitrogen, the above prepared solid (0.237 g), water (20 ml), cupric chloride dihydrate (0.171 g), reagent grade copper powder (0.159 g) and acrylonitrile (1.2 g) were charged, and the reactor was sealed. The hydration reaction was carried out at 80° C for 30 minutes. The conversion of acrylonitrile and the selectivity to acrylamide were respectively 56.1 and 100%.

EXAMPLE 42

As in Example 41 but using cuprous chloride (0.198 g) in place of cupric chloride dihydrate and decreasing the amount of the reagent grade copper powder to 0.095 g, the operation was carried out. The conversion of acrylonitrile and the selectivity to acrylamide were respectively 58.9 and 100%.

EXAMPLE 43

As in Example 41 but using cuprous chloride (0.198 g) in place of cupric chloride dihydrate and employing no copper powder, the operation was carried out. The conversion of acrylonitrile and the selectivity to acrylamide were respectively 28.7 and 100%.

EXAMPLE 44

Into a 50 ml volume reactor flushed with nitrogen, a solution of sodium hydroxide (0.12 g) in water (20 ml) was charged, and vanadium pentoxide (0.091 g) was added thereto while stirring. After the reaction mixture turned to colorless, cupric chloride dihydrate (0.426 g) was added thereto. The yellowish green precipitate was washed with water by decantation, and water (20 ml), reagent grade copper powder (0.095 g) and acrylonitrile (1.2 g) were added thereto. The hydration reaction was carried out at 80° C for 30 minutes. The conversion of acrylonitrile and the selectivity to acrylamide were respectively 90.6 and 100%.

EXAMPLE 45

Into a 50 ml volume reactor flushed with nitrogen, a solution of sodium hydroxide (0.048 g) in water (20 ml) was charged, and vanadium pentoxide (0.036 g) was added thereto while stirring. After the reaction mixture turned to colorless, cupric chloride dihydrate (0.171 g) was added thereto, whereby a yellowish green precipitate was formed. Then, reagent grade copper powder (0.064 g) and acrylonitrile (1.2 g) were added thereto, and the hydration reaction was carried out at 80° C for 30 minutes. The conversion of acrylonitrile and the selectivity to acrylamide were respectively 99.9 and 100%.

EXAMPLE 46

Into a 300 ml volume reactor flushed with nitrogen, a solution of sodium hydroxide (0.072 g) in water (20 ml) was charged, and vanadium pentoxide (0.055 g) was added thereto while stirring. After the reaction mixture turned to colorless, cupric chloride dihydrate (0.256 g) was added thereto, whereby a yellowish green precipitate was formed. Then, reagent grade copper powder (0.095 g) and acrylonitrile (1.2 g) were added thereto, and stirring was effected at room temperature for 30 minutes. Further, water (180 ml) and acrylonitrile (10.8 g) were added to the resulting mixture, and the hydration reaction was carried out at 80° C for 1 hour. The conversion of acrylonitrile and the selectivity to acrylamide were respectively 50.6 and 100%, and the yield of acrylamide was 8.12 g. Acrylonitrile (12 g) was additionally added to the reaction mixture, and the hydration reaction was further continued at 80° C for 2 hours. The total conversion of acrylonitrile was 47.6%, and the total yield of acrylamide was 15.30 g.

EXAMPLE 47

Into a 50 ml volume reactor flushed with nitrogen, a solution of sodium orthovanadate (0.202 g) in water (20 ml) was charged, and cupric chloride dihydrate (0.256 g) was added thereto while stirring, whereby a yellowish green precipitate was produced. Reagent grade copper powder (0.095 g) and methacrylonitrile (1.2 g) were added to the resulting mixture, and the hydration reaction was carried out at 80° C for 30 minutes. After completion of the reaction, the produced amide was quantitatively determined to confirm the conversion of methacrylonitrile being 91.5%. No by-product was detected.

EXAMPLE 48

As in Example 47 but using allyl cyanide (1.2 g) in place of methacrylonitrile, the operation was carried out. The conversion of allyl cyanide was 40.8%. No by-product was detected.

EXAMPLE 49

As in Example 47 but using crotononitrile (cis : trans = 3 : 2) (1.2 g) in place of methacrylonitrile, the operation was carried out. The conversions of cis-crotononitrile and trans-crotononitrile were respectively 3.3 and 87.5%. No by-product was detected.

EXAMPLE 50

Into a 50 ml volume reactor flushed with nitrogen, a solution of sodium orthovanadate (0.2 mmole) in water (10 ml) was charged, and cupric chloride (0.5 mmole) and copper powder (0.5 mmole) were added thereto. Then, nicotinonitrile (2.0 g) and methanol (10 ml) were added to the resulting mixture, and the hydration reaction was carried out at 80° C for 30 minutes. The reaction mixture was quantitatively analyzed by the use of a Waters liquid chromatograph Type 244 with a column $\mu$-Bondpak-$C_{18}$ at UV = 254 nm to confirm the yield of nicotinamide being 80.4%. No by-product was detected. The reaction mixture was treated in a conventional manner to obtain the product, which was identified to nicotinamide by MASS, NMR, IR, etc.

EXAMPLE 51

As in Example 50 but using benzonitrile (2.0 g) in place of nicotinonitrile, the operation was carried out. The reaction mixture was quantitatively analyzed by the use of a Waters liquid chromatograph Type 244 with a column μ-Bondpak-CN at UV = 254 nm to confirm the yield of benzamide being 73.0%. The reaction mixture was treated in a conventional manner to obtain the product, which was identified to benzamide by MASS, NMR, IR, etc.

EXAMPLES 52 to 58

Sodium carbonate (0.3 mole) and vanadium pentoxide (0.1 mole) were added to water (200 ml), and the resulting mixture was heated to make colorless. The resultant solution containing sodium vanadate (20 ml) was charged into a 50 ml volume reactor flushed with nitrogen, and cupric chloride, cuprous chloride and acrylonitrile were added thereto. The hydration reaction was carried out at 80° C for 30 minutes. After completion of the reaction, the reaction mixture was quantitatively determined. The results are shown in Table 8. No ethylene cyanohydrin was detected.

Table 8

| Example | $Na_3VO_4$ (mmole) | $CuCl_2$ (mmole) | CuCl (mmole) | Conversion (%) |
|---|---|---|---|---|
| 52 | 0.45 | 0.56 | 1.69 | 90.1 |
| 53 | 0.45 | 0.11 | 2.14 | 30.1 |
| 54 | 0.563 | 0.675 | 1.575 | 93.5 |
| 55 | 0.563 | 0.225 | 2.025 | 24.7 |
| 56 | 0.75 | 0.9 | 1.35 | 68.4 |
| 57 | 0.75 | 0.225 | 2.025 | 27.4 |
| 58 | 1.125 | 1.35 | 0.9 | 54.3 |

EXAMPLE 59

Into a 50 ml volume reactor flushed with nitrogen, cupric sulfate (0.45 mmole), sodium vanadate as prepared in Example 58 (0.45 mmole), cuprous chloride (1.8 mmole), acrylonitrile (1.5 ml) and water (20 ml) were charged, and the hydration reaction was carried out at 80° C for 30 minutes. After completion of the reaction, the produced amide was quantitatively determined to confirm the conversion of acrylonitrile being 78.0%. No by-product was detected.

EXAMPLES 60 to 62

(A) Preparation of Catalyst

An aqueous solution of sodium orthovanadate was prepared from vanadium pentoxide (0.5 mole) and sodium hydroxide (3 mole) by a conventional procedure.

(B) Hydration of Nitrile Compound

Into a 50 ml volume reactor flushed with nitrogen, the aqueous solution of sodium orthovanadate as prepared above (0.45 mmole), an additive, cupric chloride 80.45 mmole), cuprous chloride (1.8 mmole) and acrylonitrile (1.5 ml) were charged, and water was added to make a volume of 20 ml. The hydration reaction was carried out at 80° C for 30 minutes. The results are shown in Table 9. No ethylene cyanohydrin was detected.

Table 9

| Example | Additive (mmole) | Conversion (%) |
|---|---|---|
| 60 | $H_2CO_3$ (0.0897 mmole) | 93.8 |
| 61 | $CH_3COOH$ (0.132 mmole) | 78.9 |
| 62 | $(COOH)_2$ (0.04 mmole) | 72.3 |

COMPARATIVE EXAMPLE 1

Into a 50 ml volume reactor flushed with nitrogen, water (20 ml), cupric chloride dihydrate (0.171 g), reagent grade copper powder (0.064 g) and acrylonitrile (1.2 g) were charged, and the hydration reaction was carried out at 80° C for 30 minutes. The conversion of acrylonitrile was less than 1%.

COMPARATIVE EXAMPLE 2

Into a 50 ml volume reactor, cuprous chloride (0.64 g; 6.5 mmole) and water (20 ml) were charged, and acrylonitrile (1.2 g) was added thereto. The hydration reaction was carried out at 80° C for 1 hour. The conversion of acrylonitrile was 1.7%.

COMPARATIVE EXAMPLE 3

Into a 50 ml volume reactor, copper powder (0.21 g; 3.25 mmole) and cupric chloride dihydrate (0.56 g; 3.25 mmole) were charged, and water (20 ml) and acrylonitrile (1.2 g) were added thereto. The hydration reaction was carried out at 80° C for 1 hour. The conversion of acrylonitrile was less than 1%.

COMPARATIVE EXAMPLE 4

Into a 50 ml volume reactor, reagent grade copper powder (0.21 g; 3.25 mmole), and sodium metavanadate tetrahydrate (0.63 g; 3.25 mmole) were charged, and water (20 ml) and acrylonitrile (1.3 g) were added thereto. The hydration reaction was carried out at 80° C for 1 hour. The conversion of acrylonitrile was 1.3%, and the yield of ethylene cyanohydrin was 0.13%.

What is claimed is:

1. A process for preparing acid amides by hydration of the corresponding nitrile compounds with water in the presence of a catalyst, characterized in that the catalyst is prepared by treating a vanadate with a cuprous salt or with at least two members selected from the group consisting of metallic copper, a cuprous salt and a cupric salt.

2. The process according to claim 1, wherein the starting nitrile compound is a member selected from the group consisting of acetonitrile, propionitrile, butyronitrile, acrylonitrile, methacrylonitrile, crotononitrile, methoxyacetonitrile, allyl cyanide, cyclohexanecarbonitrile, benzyl cyanide, cinnamonitrile, α-naphthylacetonitrile, benzonitrile, naphthonitrile, nicotinonitrile, cyanogen, adiponitrile, phthalonitrile, glutaronitrile, benzoyl cyanide and acetyl cyanide.

3. The process according to claim 2, wherein the starting nitrile compound is acrylonitrile or methacrylonitrile.

4. The process according to claim 1, wherein the hydration is carried out in the presence of an excessive amount of water at a temperature from room temperature to 300° C.

5. The process according to claim 1, wherein the vanadate is at least one member selected from the group consisting of sodium orthovanadate, sodium metavanadate, sodium pyrovanadate, potassium orthovanadate, potassium metavanadate, potassium pyrovanadate, cuprous orthovanadate, cupric orthovanadate, cuprous metavanadate, cupric metavanadate, cuprous pyrovanadate, cupric pyrovanadate, polyvanadates and isopolyvanadates.

6. The process according to claim 1, wherein the vanadate is cupric vanadates or mixtures thereof prepared by admixing an alkali metal or alkaline earth metal vanadate with a cupric salt in an aqueous medium.

7. The process according to claim 6, wherein the cupric salt is a member selected from the group consisting of cupric chloride, cupric bromide, cupric sulfate, cupric nitrate, cupric perchlorate, cupric formate, cupric acetate, cupric propionate, cupric hydroxide and cupric carbonate.

8. The process according to claim 6, wherein the cupric vanadate is used for the preparation of the catalyst without its separation from the reaction mixture.

9. The process according to claim 1, wherein the vanadate is prepared by dissolving vanadium pentoxide or ammonium vanadate with an alkali metal salt in an aqueous medium, or by mixing them together and heating the resultant mixture.

10. The process according to claim 1, wherein the cuprous salt is a member selected from the group consisting of cuprous chloride, cuprous bromide, cuprous iodide, cuprous sulfate, cuprous nitrate, cuprous formate, cuprous acetate and cuprous oxide.

11. The process according to claim 1, wherein the cupric salt is a member selected from the group consisting of cupric chloride, cupric bromide, cupric sulfate, cupric nitrate, cupric perchlorate, cupric formate, cupric acetate, cupric propionate, cupric hydroxide, cupric carbonate and cupric oxide.

12. The process according to claim 1, wherein the treatment is carried out in the presence of a nitrile compound.

13. The process according to claim 1, wherein the catalyst is prepared by treating a vanadate with a cuprous salt in an atomic ratio of Cu : V being from 1 : 0.01 to 1 : 100.

14. The process according to claim 1, wherein the catalyst is prepared by treating a vanadate with at least two members selected from the group consisting of metallic copper, a cuprous salt and a cupric salt in an atomic ratio of Cu : V being from 1 : 0.01 to 1 : 100.

15. The process according to claim 14, wherein an atomic ratio of $Cu^o : Cu^I$, $Cu^o : Cu^{II}$ or $Cu^I : Cu^{II}$ is from 1 : 0.01 to 1 : 100, or an atomic ratio of $Cu^o : Cu^I : Cu^{II}$ is from 1 : 0.01 : 0.01 to 1 : 100 : 100.

16. A catalyst prepared by treating a vanadate with a cuprous salt or with at least two members selected from the group consisting of metallic copper, a cuprous salt and a cupric salt.

* * * * *